US012796599B2

(12) United States Patent
Sandbichler et al.

(10) Patent No.: US 12,796,599 B2
(45) Date of Patent: Nov. 17, 2026

(54) MOTORIZED LAWNMOWER, AND USE OF MOWER HOUSING

(71) Applicant: Andreas Stihl AG & Co. KG, Waiblingen (DE)

(72) Inventors: Christian Sandbichler, Langkampfen (AT); Markus Gassner, Koessen (AT); Kurt Hoerfarter, Niederndorf (AT); Manfred Hofer, Brixen im Thale (AT); Walter Wiest, Thiersee (AT); Clara Wohnlich, Oberaudorf (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 312 days.

(21) Appl. No.: 18/770,169

(22) Filed: Jul. 11, 2024

(65) Prior Publication Data

US 2025/0017141 A1 Jan. 16, 2025

(30) Foreign Application Priority Data

Jul. 12, 2023 (EP) .................................... 23185078

(51) Int. Cl.

*A01D 34/76* (2006.01)
*A01D 34/81* (2006.01)
*A01D 101/00* (2006.01)

(52) U.S. Cl.

CPC ............ *A01D 34/76* (2013.01); *A01D 34/81* (2013.01); *A01D 2101/00* (2013.01)

(58) Field of Classification Search

CPC .... A01D 34/76; A01D 34/81; A01D 2101/00; A01D 34/78; A01D 34/68; A01D 34/71
See application file for complete search history.

(56) References Cited

U.S. PATENT DOCUMENTS

| | | | | | |
|---|---|---|---|---|---|
| 3,044,239 | A * | 7/1962 | Harkness | A01D 34/6806 | 123/185.14 |
| 3,593,505 | A * | 7/1971 | Mittelstadt | A01D 69/02 | 56/17.5 |
| 4,944,142 | A * | 7/1990 | Sueshige | A01D 34/82 | 56/320.1 |
| 5,060,460 | A * | 10/1991 | Dunn | A01D 34/49 | 56/13.3 |

(Continued)

FOREIGN PATENT DOCUMENTS

| | | | | |
|---|---|---|---|---|
| CN | 108142103 A | | 6/2018 | |
| CN | 215421683 U | * | 1/2022 | A01D 34/68 |

(Continued)

*Primary Examiner* — Arpad Fabian-Kovacs
(74) *Attorney, Agent, or Firm* — Crowell & Moring LLP

(57) ABSTRACT

A motorized lawnmower has a drive motor which has a drive shaft, a movable cutting tool, and a mower housing having a hood-shaped mower deck which is open towards a mowing side. The mower housing is configured for use with a motorized lawnmower having an internal combustion engine as the drive motor. A belt compartment is provided in the mower housing outside the mower deck. The drive motor is an electric motor, and a cooling air routing having an air inlet, an air outlet and an air guiding path from the air inlet to the air outlet is formed in the mower housing. A fan which is capable of being driven by the electric motor is arranged in the air guiding path, and the belt compartment is configured to form part of the air guiding path.

10 Claims, 4 Drawing Sheets

(56) References Cited

U.S. PATENT DOCUMENTS

| | | | | |
|---|---|---|---|---|
| 5,483,788 | A * | 1/1996 | Fassauer | A01D 34/695 56/12.1 |
| 6,282,874 | B1 * | 9/2001 | Schaedler | A01D 43/077 56/320.1 |
| 6,434,918 | B1 * | 8/2002 | Csonka | A01D 34/826 56/13.4 |
| 9,642,303 | B2 * | 5/2017 | Walden | A01D 43/077 |
| 9,756,788 | B1 * | 9/2017 | Hauser | B60L 3/0061 |
| 9,991,825 | B1 * | 6/2018 | Ackerman | H02P 7/06 |
| 10,188,032 | B2 * | 1/2019 | Ito | A01D 34/81 |
| 10,426,084 | B2 * | 10/2019 | Ito | A01D 34/78 |
| 2003/0037523 | A1 | 2/2003 | Shimada et al. | |
| 2003/0182919 | A1 | 10/2003 | Baumann et al. | |
| 2016/0338266 | A1 * | 11/2016 | Yamaoka | A01D 34/6806 |
| 2017/0152638 | A1 * | 6/2017 | Fu | E01H 5/098 |
| 2019/0111789 | A1 * | 4/2019 | Matsuda | B60T 1/005 |
| 2020/0177052 | A1 | 6/2020 | Fujiwara | |
| 2020/0196522 | A1 | 6/2020 | Feng et al. | |
| 2020/0346535 | A1 * | 11/2020 | Dallas | H01M 50/244 |
| 2021/0112712 | A1 * | 4/2021 | Vaughn | A01D 34/68 |
| 2025/0187424 | A1 * | 6/2025 | Bonny | A01D 69/025 |

FOREIGN PATENT DOCUMENTS

| | | | | |
|---|---|---|---|---|
| EP | 3659420 | A1 * | 6/2020 | H02K 5/207 |
| EP | 3 673 722 | A1 | 7/2020 | |
| JP | 3776771 | B2 | 5/2006 | |

* cited by examiner

FIG. 5
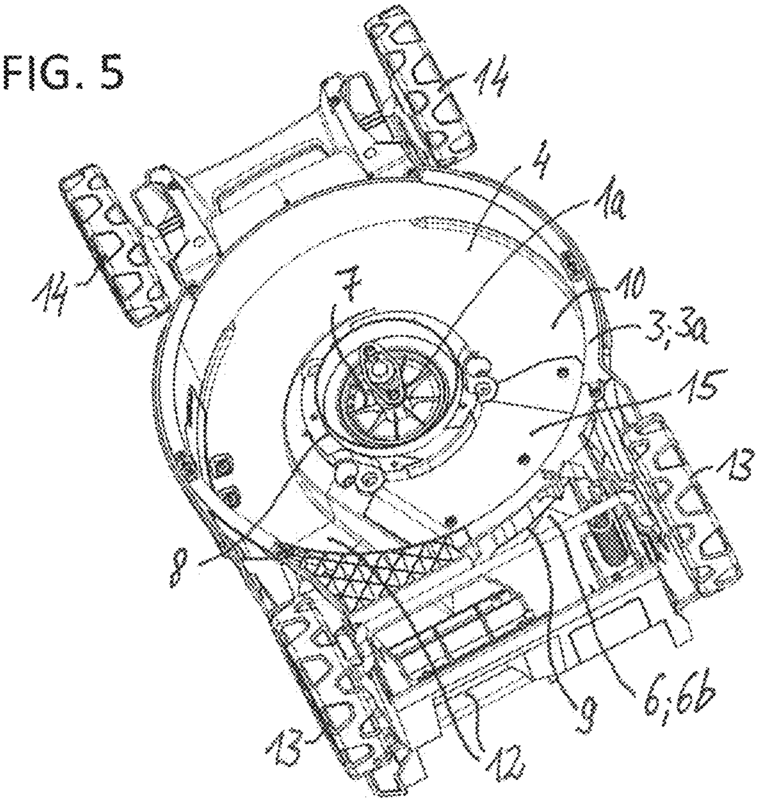
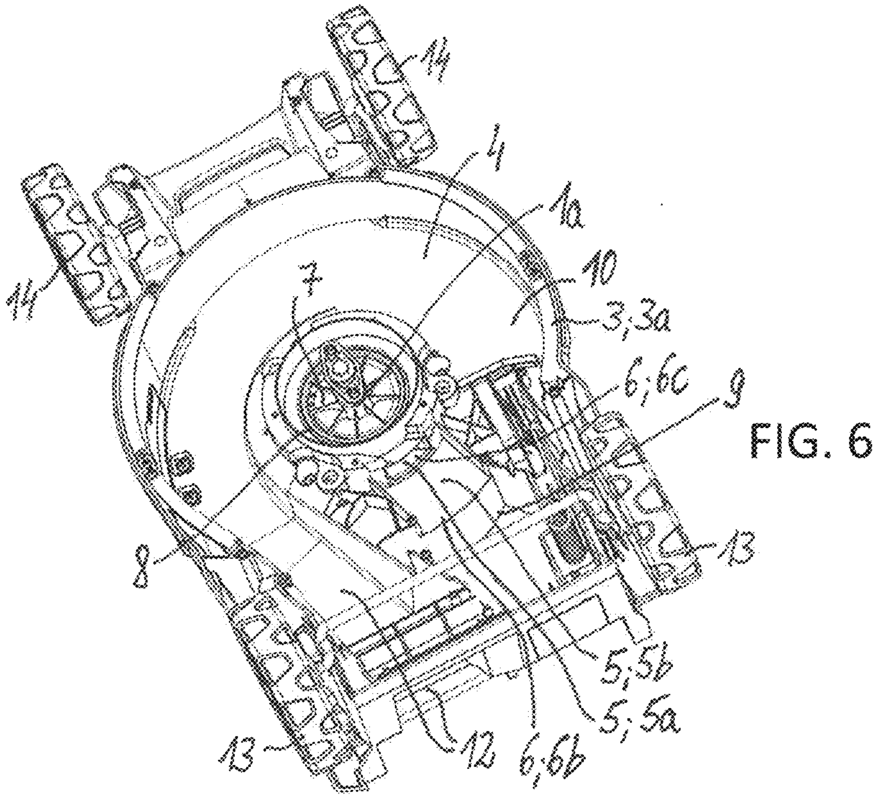
FIG. 6

MOTORIZED LAWNMOWER, AND USE OF MOWER HOUSING

CROSS REFERENCE TO RELATED APPLICATION

This application claims priority under 35 U.S.C. § 119 from European Patent Application No. 23185078.5, filed Jul. 12, 2023, the entire disclosure of which is herein expressly incorporated by reference.

BACKGROUND AND SUMMARY

The invention relates to a motorized lawnmower comprising a drive motor, a movable cutting tool that is able to be driven by the drive motor, a motor housing having a hood-shaped mower deck which is open towards a mowing side and within which is arranged the cutting tool, wherein the mower housing is configured for use with a motorized lawnmower having an internal combustion engine as the drive motor in that provided in the mower housing outside the mower deck is a belt compartment which is configured to receive a drive belt connected to a drive shaft of the internal combustion engine. The invention furthermore relates to the use of a mower housing for a lawnmower.

By way of its open mowing side, the mower deck, and thus the entire lawnmower, faces an area to be mowed, such as a lawn, during operation, i.e. the open mowing side usually faces downwards during operation of the mower. The hood shape of the mower deck channels the mowed grass clippings, for which purpose the mower deck in most instances forms an associated mowing channel, preventing them in particular from entering the mower housing at the top or being ejected laterally outwards at a high velocity, this being caused by the rapid cutting movement of the cutting tool, in most instances a rotating movement.

Motorized lawnmowers of this type, in which an internal combustion engine is used as the drive motor, are known in various embodiments and are marketed by the applicant. In the case of a self-propelled type of such lawnmower, i.e. one that is propelled by a motorized drive, it is furthermore known to additionally use the drive motor not just as the drive for the cutting tool but also as a drive for one or a plurality of wheels of the mower, and for this purpose to couple a rear-wheel or front-wheel drive unit, or drive gear unit, to the drive shaft of the internal combustion engine via a drive belt, such as a timing belt. The drive belt is received in a belt compartment which is formed in the mower housing for this purpose, which has on its lower side the hood-shaped mower deck in which the cutting tool is disposed. The belt compartment is formed outside the mower deck, i.e. so as to be separate from the mowing side of the mower deck that is open towards the outside or the bottom, respectively, which prevents excessive contamination of the belt compartment, or of the drive belt, respectively.

Instead of such lawnmowers with an internal combustion engine, motorized lawnmowers with an electric motor as the drive motor have increasingly been used in the last few years. This electric motor usually requires cooling, which is why it is known to provide for this purpose a cooling air routing having an air inlet, an air outlet and an air guiding path from the air inlet to the air outlet in the mower housing, and to dispose a fan which is able to be driven by the electric motor in the air guiding path. The fan generates a cooling air flow through the air guiding path in which are located inter alia the electric motor to be cooled, or components thereof to be cooled, respectively. Moreover, electronic components for the mower motor, i.e. the drive motor of the cutting tool, and for a propulsion drive, can be accommodated in the region around which cooling air circulates. Various lawnmowers of this type, having an electric motor as the drive motor and assigned air cooling, are disclosed in laid-open publications EP 3 673 722 A1, EP 3 659 420 A1 and CN 108142103 A.

It is an object of the invention to provide a motorized lawnmower of the type mentioned at the outset, which is further improved in comparison with the prior art mentioned above, and in particular enables an advantageous multiple use, or common-part use, of a mower component for different lawnmower embodiments. It is another object of the invention to provide a use of an associated mower housing.

The invention achieves this and other objects by providing a motorized lawnmower and a use of a mower housing in accordance with the independent claim(s). Advantageous refinements of the invention are the subject of the dependent claims, the wording of which herewith being incorporated into the description by way of reference. This includes in particular also all embodiments of the invention which are derived from the combinations of features defined by back-references in the dependent claims.

According to the invention, the lawnmower has, in addition to the features mentioned at the outset, an electric motor as the drive motor, and a cooling air routing having an air inlet, an air outlet and an air guiding path from the air inlet to the air outlet is formed in the mower housing, wherein a fan which is capable of being driven by the electric motor is arranged in the air guiding path, and the belt compartment is configured to form part of the air guiding path.

Consequently, the belt compartment in the lawnmower according to the invention fulfils an air guiding function as part of the air guiding path of a cooling air routing, wherein the cooling air can serve in particular to cool the electric motor which functions as the drive motor for the cutting tool. Optionally, electronic components, for example for the mower motor and/or a propulsion drive, can moreover be accommodated in the region around which cooling air circulates. The mower housing, by virtue of the belt compartment present therein, can also be used for a lawnmower not according to the invention, which possesses an internal combustion engine as the drive motor for the cutting tool and in which the belt compartment serves to receive a drive belt by way of which a wheel drive unit, or a wheel drive gear unit, for example, is coupled to the drive shaft of the internal combustion engine, i.e. connected to this drive shaft, for the purpose of a motorized drive of one or a plurality of wheels of the lawnmower or any other component of the mower to be driven in a motorized manner.

This advantageously results in multiple uses for the mower housing and the belt compartment formed in the latter outside the mower deck. In embodiments of mowers not according to the invention, having an internal combustion engine, the belt compartment of the mower housing serves to receive, as usual, the drive belt for the wheel drive or for any other drive; in embodiments of the lawnmower according to the invention, having an electric motor, the belt compartment serves as part of the air guiding path of the cooling air routing by way of which cooling air can be guided across the electric motor, or components thereof to be cooled, respectively.

Therefore, the mower housing having the belt compartment formed therein can be used in completely, or in any case substantially, unchanged form, i.e. in an identical construction, for lawnmower embodiments having an internal combustion engine, or having an electric motor, independently of whether the respective lawnmower is equipped with the internal combustion engine or the electric motor as the drive motor. This represents an advantageous capability to use the mower housing as a common part.

Because the belt compartment is formed outside the mower deck in the mower housing, the cooling air can be guided outside the mower deck by said belt compartment. In this way, a connection between the air guiding path and the space which is delimited by the hood-shaped mower deck and in which the cutting tool is located and the mowed grass clippings is present during active mower operation can be avoided. Such a connection between the air guiding path for the cooling air and this active mowing space, also referred to as the mowing channel, which is delimited by the hood-shaped mower deck, is most typically undesirable for reasons of susceptibility to contamination and the air pressure conditions during active operation of the cutting tool, which is typically activated in a rotating manner.

In a refinement of the invention, the belt compartment extends from a drive shaft region of the mower housing to a wheel drive region of the mower housing. In this way, the belt compartment can in particular serve to receive a drive belt for driving one or a plurality of wheels, such as the rear wheels or the front wheels, of the lawnmower if the lawnmower is equipped with the internal combustion engine, while the belt compartment advantageously enables cooling air to be guided from the region of the drive shaft of the electric motor in the mower housing up to the wheel drive region of the mower housing in the case of the lawnmower fitted with the electric motor.

Discharging the cooling air, or alternatively inducting the cooling air, in this wheel drive region of the mower housing is advantageous in terms of guiding the cooling air in many cases. Furthermore, cooling of one or a plurality of components located in the wheel drive region, such as a wheel drive gear disposed there, or a separate electric wheel drive motor disposed there, can take place by the cooling air in said wheel drive region, depending on the requirement. In alternative embodiments, in which not a wheel but another mower component is to be driven by the drive motor by way of the drive belt, the belt compartment can extend from the drive shaft region of the mower housing to another region of the mower housing if the lawnmower is equipped with the internal combustion engine.

In a refinement of the invention, the belt compartment extends so as to be substantially parallel to a rotation plane of the cutting tool. In this case, the cooling air in the belt compartment is accordingly guided so as to be likewise substantially parallel to the rotation plane of the cutting tool, i.e. perpendicularly to the rotation axis of the cutting tool, and thus also generally substantially perpendicularly to the drive shaft of the electric motor. Therefore, the cooling air can be guided across the electric motor and subsequently through the belt compartment, and guided away from the region of the electric motor, or its drive shaft, radially to the outside, for example. In alternative embodiments, the belt compartment extends by way of a noticeable oblique angle to the rotation plane of the cutting tool, or a cutting tool which is not rotationally driven is used.

In a refinement of the invention, the belt compartment extends so as to be contiguous to a hood top side of the mower deck. In this way, the cooling air in the mower housing can be guided through the belt compartment directly over the mower deck and so as to be separated from the latter's mowing side which is bordered in a hood-shaped manner and open towards the outside. In alternative embodiments, the belt compartment extends so as to be spaced apart vertically from the mower deck, or from the hood top side of the latter, for example.

In a refinement of the invention, the air inlet and the air outlet are located outside the mower deck. This embodiment has the advantage that neither the air inlet nor the air outlet open into the open mowing side that is bordered in a hood-shaped manner by the mower deck. This facilitates guiding of the cooling air independently of the mowed grass clippings and the air pressure conditions on the open mowing side of the mower deck during active mower operation. In alternative embodiments, the air inlet and/or the air outlet can be located on the mower deck if this is expedient for corresponding specific applications.

In a refinement of the invention, the air inlet is located in an upper region of the mower housing. This embodiment is advantageous for many applications because the air inlet in this case is located so as to be comparatively far away from the lower region of the mower housing, which is more susceptible to contamination, i.e. relatively far away from the mower deck and the mowing space bordered by the latter. In alternative embodiments, the air inlet is disposed in another region of the mower housing, for example in a lateral region of the mower housing, if this offers advantages for corresponding applications.

In a refinement of the invention, the air outlet is located in a lower rear or lower front region of the mower housing outside the mower deck. For numerous applications this represents an advantageous positioning of the air outlet. In this case, the cooling air can be discharged from the mower housing so as to be relatively close to the ground, without being influenced by the contamination and air pressure conditions in the mower deck, or the mowing space, respectively. The positioning of the air outlet in a lower region of the mower housing can be advantageous in particular in combination with the positioning of the air inlet in an upper region of the mower housing, for example. The positioning of the air outlet in the rear or front region of the mower housing is expedient, for example, when the belt compartment extends into this region, so as to couple a wheel drive located in the drive motor to the internal combustion engine drive shaft by way of the drive belt should the internal combustion engine be used as the drive motor. In alternative embodiments, the air outlet can be located in any other region of the mower housing, for example in an upper or lateral region of the mower housing, if this is favorable for corresponding applications.

In a refinement of the invention, the mower housing has a motor housing which is disposed on the mower deck and in which the drive motor is disposed. In this case, the drive motor is located in the motor housing which forms an independent part of the mower housing in relation to the mower deck. In a corresponding implementation, the motor housing can be releasably attached to the mower deck so that said motor housing can be removed from the latter if required. The belt compartment is preferably located on the part of the mower housing that forms the mower deck but may alternatively also be located on the part of the mower housing that forms the motor housing, if this offers advantages for the specified type of application. In further alternative embodiments the mower housing is not divided among the mower deck part and the motor housing part but is structured differently, for example as an integral housing body which in a lower region forms the mower deck and in a region thereabove receives the drive motor.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5 shows a perspective view from below of the lawnmower of FIG. 1;

FIG. 6 shows the view of FIG. 5 having a belt compartment cover removed.

DETAILED DESCRIPTION OF THE DRAWINGS

Figure 1:
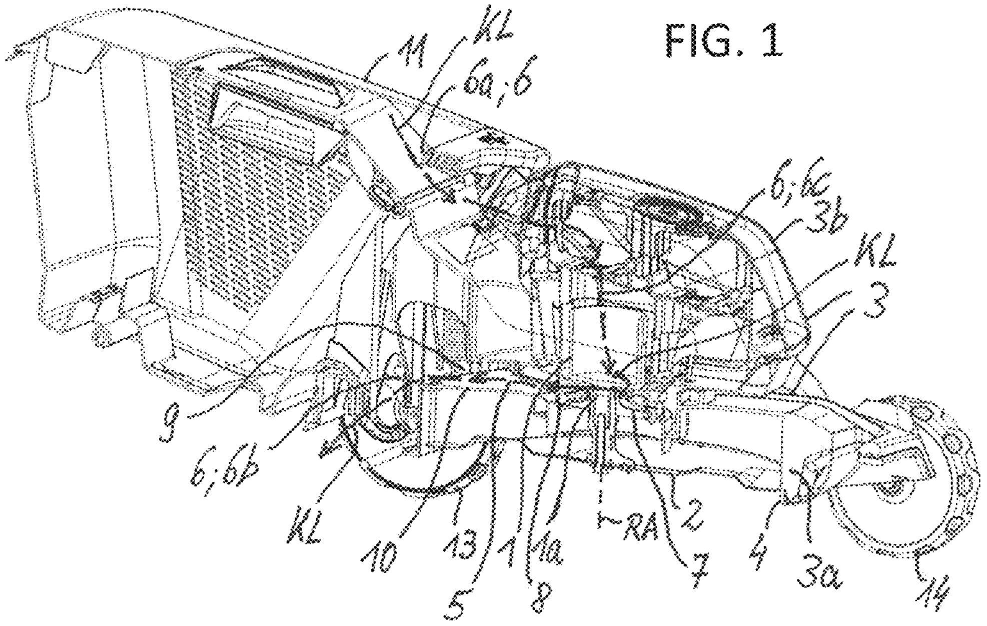
FIG. 1 shows a perspective longitudinal sectional view of a motorized lawnmower according to the invention, having an electric motor.

As is visualized by means of an exemplary embodiment in FIGS. 1 to 6, the motorized lawnmower according to the invention comprises a drive motor 1 having a drive shaft 1*a*, wherein there is an electric motor for the drive motor 1. Electric motors which are known per se to the person skilled in the art for this specific application can be used for this purpose, which does not require any more detailed explanation here. Furthermore, the lawnmower contains a movable cutting tool 2 which is able to be driven by the drive motor 1, and a mower housing 3 having a hood-shaped mower deck 3*a* which is open towards a mowing side 4 and within which the cutting tool 2 is disposed. As in the embodiment shown, the cutting tool 2 can be for example a rotatably disposed cutting tool such as a rotating mower or cutting blade.

The mower housing 3 is configured for use with a motorized lawnmower having an internal combustion engine as the drive motor for the cutting tool 2, wherein provided in the mower housing 3 outside the mower deck 3*a* is a belt compartment 5 which is configured for receiving a drive belt which, when using the internal combustion engine as the drive motor, is connected to the driveshaft thereof.

Shown in FIGS. 1 to 6 is the lawnmower in the embodiment according to the invention, in which said lawnmower is equipped with the electric motor as the drive motor 1. The drive belt is absent in this embodiment. Nevertheless, the belt compartment 5 is present in the mower housing 3, unmodified in terms of its structure, in which it receives the drive belt which is provided if the internal combustion engine is used as the drive motor.

Figure 7:
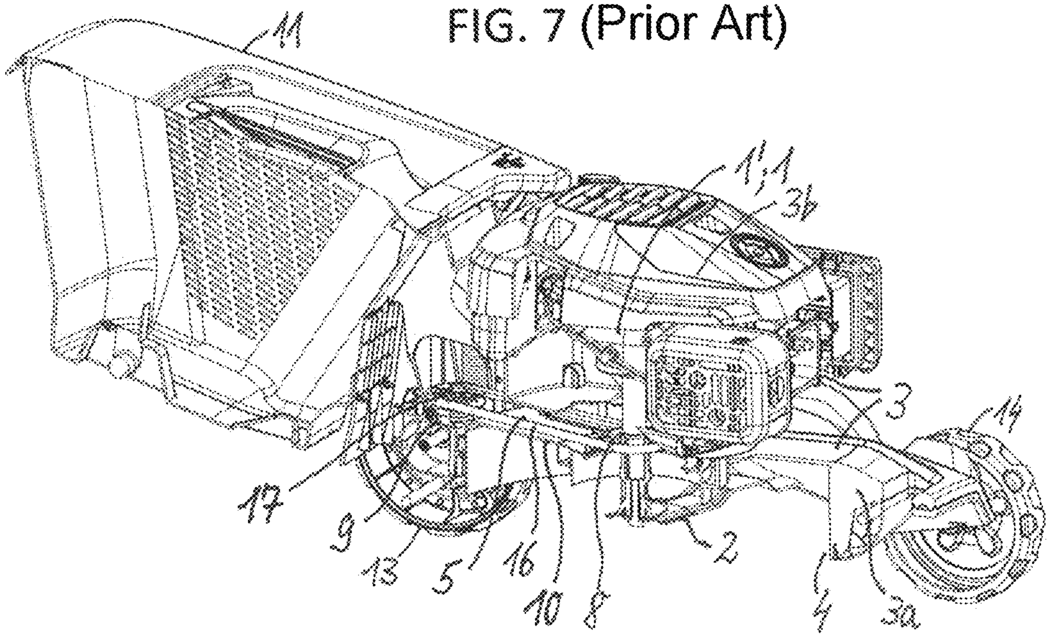
FIG. 7 (Prior Art)
FIG. 7 shows the view of FIG. 1 for a conventional motorized lawnmower having an internal combustion engine.

FIG. 7 shows a view, corresponding to that of FIG. 1, of a conventional lawnmower which, instead of the electric motor in the lawnmower according to the invention of FIGS. 1 to 6, possesses an internal combustion engine 1' as the drive motor 1 for the cutting tool 2, and in which a drive belt 16 which is coupled to the driveshaft of the internal combustion engine 1' is received in the belt compartment 5. A rear wheel drive 17 can be driven by the internal combustion engine 1' by way of the drive belt 16. In other aspects, this conventional lawnmower corresponds substantially to the lawnmower according to the invention of FIGS. 1 to 6, wherein the same reference signs are used for identical or functionally equivalent components for the purpose of easier understanding; to this extent, reference may be made to the explanations pertaining to FIGS. 1 to 6. In particular, the mower housing 3 can be used in a substantially identical construction for the two mower embodiments; potential modifications may relate to the accommodation of the internal combustion engine and associated peripheral components such as carburetor, etc., and to an optional internal combustion engine cooling instead of the cooling air routing 6. The fan 7 is absent in this conventional lawnmower, as is the cooling air routing 6, and the drive belt is coupled to the driveshaft of the internal combustion engine 1' approximately where the fan 7 is coupled to the driveshaft 1*a* of the electric motor in the lawnmower according to the invention of FIGS. 1 to 6.

As can be seen from FIGS. 1 to 6, the lawnmower according to the invention contains a cooling air routing 6 in the mower housing 3, having an air inlet 6*a*, an air outlet 6*b*, and an air guiding path 6*c* from the air inlet 6*a* to the air outlet 6*b*. A fan 7 which is able to be driven by the electric motor 1 is arranged in the air guiding path 6*c*, wherein the belt compartment 5 forms part of the air guiding path 6*c*. Cooling air can be guided by the cooling air routing 6 as a cooling air flow along the air guiding path 6*c* from the air inlet 6*a* to the air outlet 6*b*, such as is schematically indicated by a dashed flow profile line KL in FIGS. 1 and 3.

Figure 2:
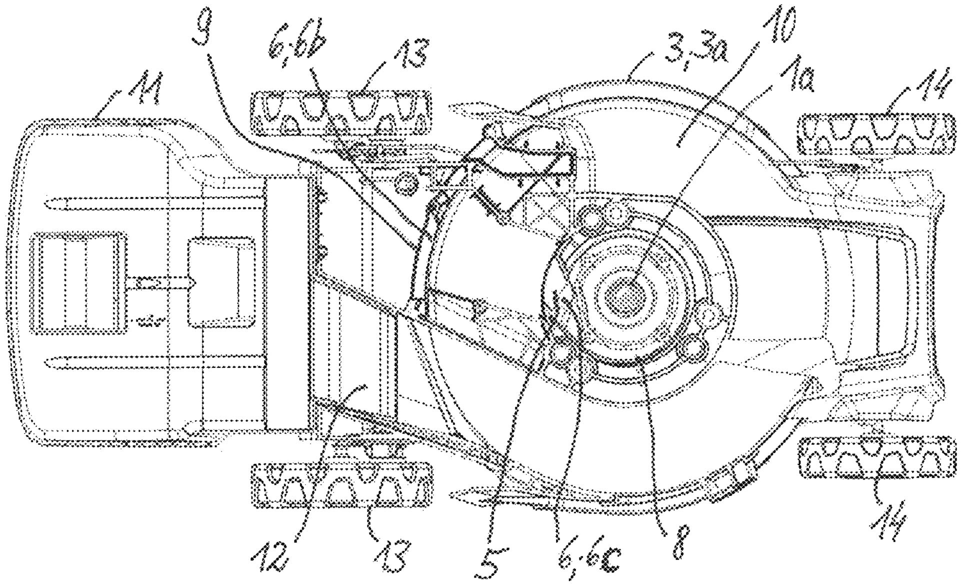
FIG. 2 shows a horizontal cross-sectional view from above of the lawnmower of FIG. 1.
Figure 3:
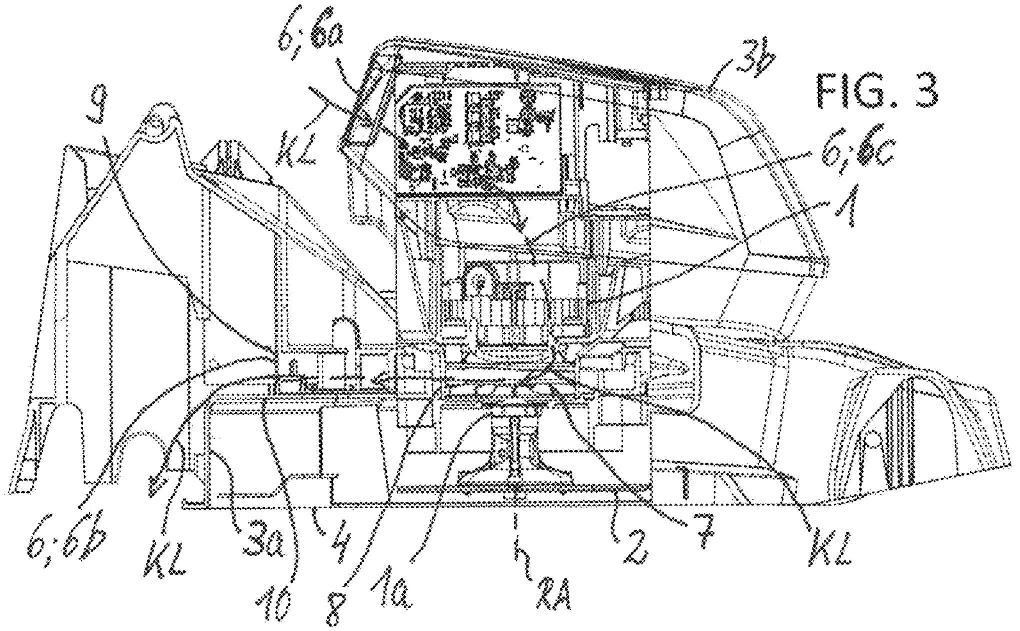
FIG. 3 shows a detailed longitudinal sectional view of the lawnmower of FIG. 1.
Figure 4:
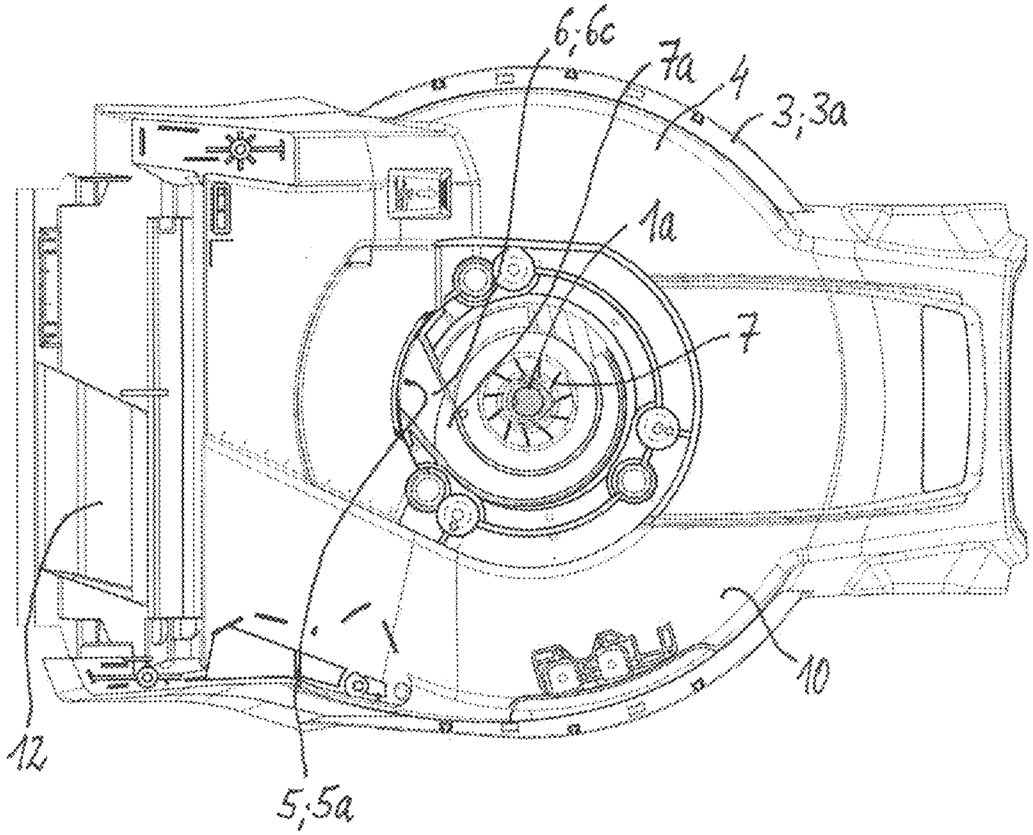
FIG. 4 shows a detailed cross-sectional view from above of the lawnmower of FIG. 1.

As can be seen in the example shown and in FIGS. 1 and 2, the lawnmower can be equipped with a conventional grass clipping collection container 11 which can be releasably attached to the mower housing 3 and into which opens a mowing channel 12 which is bordered by the mower deck 3*a* and guides the mowed grass clippings. The mowing channel 12 here is designed to be separate from the belt compartment 5 in this lower part of the mower housing 3. In the example shown, the lawnmower is embodied as a lawnmower which has two rear wheels 13 and two front wheels 14 and is pedestrian-controlled by the user by way of a handlebar not illustrated.

In advantageous implementations of the lawnmower, as in the example shown, the belt compartment 5 extends from a driveshaft region 8 of the mower housing 3 to a wheel drive region 9 of the mower housing 3. Consequently, the part of the air guiding path 6*c* formed by the belt compartment 5 correspondingly leads from the driveshaft region 8 of the mower housing 3 to the wheel drive region 9 of the mower housing 3. The driveshaft region 8 herein is that region of the mower housing 3 in which the driveshaft 1*a* of the drive motor 1 is located, while the wheel drive region 9 is that region of the mower housing 3 in which a wheel drive coupled to the driveshaft 1*a* of the drive motor 1 by way of the drive belt is located if the internal combustion engine is used as the drive motor 1. In the example shown, the wheel drive region 9 is located in the rear part of the mower housing 3, so that the rear wheels 13 of the lawnmower can in this case be driven by the wheel drive, as a result of which the lawnmower is embodied so as to be self-propelled and does not have to be pushed by the user. When equipped with the electric motor, the lawnmower can likewise be implemented so as to be self-propelled, for example in that an additional electric motor, separate from the drive motor 1 for the cutting tool, is disposed in the wheel drive region 9.

In advantageous embodiments, as in the example shown, the fan 7 and the cutting tool 2 are disposed so as to be coaxial on the driveshaft 1*a*, i.e. both sit conjointly on the driveshaft 1*a*, wherein the fan 7 in the example shown is disposed between the motor body of the drive motor 1 and the cutting tool 2. For example, the fan 7 can be coupled to the driveshaft 1*a* at the location at which the drive belt, which in this instance is received in the belt compartment 5, is coupled to the driveshaft 1*a* if the lawnmower is equipped with the internal combustion engine instead of the electric motor as the drive motor 1.

In advantageous implementations, as in the example shown, the fan 7 is a radial fan having a fan rotation axis which is parallel to the driveshaft 1*a* of the drive motor 1, so that the cooling air exits the region of the fan 7 so as to be substantially perpendicular to the fan rotation axis. As can be seen from FIG. 4, for example, the fan 7 in this case possesses a fan housing which, by way of a funnel-shaped region 7*a*, is enlarged radially towards the outside and then opens into the belt compartment 5.

In advantageous embodiments, as in the example shown, the belt compartment 5 extends so as to be substantially parallel to a rotation plane of the cutting tool 2, i.e. perpendicularly to a rotation axis RA of the cutting tool 2. This means that the part of the air guiding path 6*c* formed by the belt compartment 5 in this case also extends parallel to the rotation plane of the cutting tool 2.

In advantageous implementations, the belt compartment 5 extends so as to be contiguous to a hood top side 10 of the mower deck 3*a*. In the example shown, the belt compartment 5 extends in particular so as to be contiguous to the upper side of the hood top side 10 of the mower deck 3*a*, from the driveshaft region 8 of the mower housing 3 towards the rear to the wheel drive region 9 of the mower housing 3 that is located in the rear part of the mower housing 3. The belt compartment 5 herein is separated in the downward direction from the open mowing side 4 by a removable cover 15 which forms a corresponding part of the hood top side 10 of the mower deck 3*a*. The cover 15 can be seen in an assembled state in FIG. 5, while FIG. 6 shows the same view with the cover 15 removed. It can be seen in the view of FIG. 6 how the belt compartment 5 leads away from the funnel-shaped region 7*a* of the fan housing by way of a drive shaft-proximal end region 5*a*, and forms the corresponding part of the air guiding path 6*c* of the cooling air routing 6 by way of a channel-shaped region 5*b*.

In advantageous embodiments, as in the example of FIGS. 1 to 6 shown, the air inlet 6*a* and the air outlet 6*b* are located outside the mower deck 3*a*. With a view to many applications it is favorable for the air inlet 6*a* to be located in an upper region of the mower housing 3, as in the example shown. It is likewise favorable with a view to numerous specific applications for the air outlet 6*b* to be located in a lower rear region of the mower housing 3 outside the mower deck 3*a*, as in the example shown. In particular, the air outlet 6*b* herein can be located on the corresponding wheel drive-proximal end of the belt compartment 5, i.e. the cooling air makes its way out of the mower housing 3 at the end of the belt compartment 5 by way of the air outlet 6*b* on the latter. Alternatively, the air outlet 6*b* can be located in a lower front region of the mower housing 3 outside the mower deck 3*a*, for example, in particular if the mower, when equipped with the internal combustion engine, possesses a front wheel drive which, by way of the drive belt, which in that case is disposed therein, is coupled to the driveshaft 1*a* of the drive motor 1.

In corresponding embodiments, as in the example of FIGS. 1 to 6 shown, the mower housing 3 has a motor housing 3*b* which is disposed on the mower deck 3*a* and in which the drive motor 1 is disposed. In the example shown, the motor housing 3*a* is releasably placed onto the mower deck 3*a* and can be removed from the latter if required.

For use of the internal combustion engine instead of the electric motor, the mower housing 3, or the motor housing 3*b*, can be of a modified design so as to be adapted to the respective requirement, so as to arrange the internal combustion engine instead of the electric motor therein. It is furthermore understood that the mower housing 3, or the motor housing 3*b*, can be configured, in a manner adapted to the use of the internal combustion engine or the electric motor, to receive means for the corresponding power supply of the drive motor 1, such as an associated rechargeable battery pack, or any other electric power supply for the electric motor, or a fuel tank for the internal combustion engine.

In the exemplary embodiment of FIGS. 1 to 6 shown, the air inlet is in particular located in the upper rear region of the motor housing 3*b*, while the air outlet 6*b* is located in a lower rear part of the mower housing 3, which forms on the lower side the mower deck 3*a* and in which the belt compartment 5 is formed.

As made clear by the exemplary embodiment shown and by the further exemplary embodiments explained above, the invention provides a motorized lawnmower which comprises a mower housing having a hood-shaped mower deck and a belt compartment formed outside the mower deck, and in which the mower housing can be used in an identical construction for an embodiment of the lawnmower with the internal combustion engine as the drive motor, as well as for an embodiment of the lawnmower having the electric motor as the drive motor, wherein a cooling air routing, in particular for cooling the electric motor, is formed in the mower housing, the belt compartment contributing towards the air guiding path of the latter without the drive belt being received in the belt compartment in this case.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motorized lawnmower, comprising:
a drive motor having a drive shaft;
a movable cutting tool capable of being driven by the drive motor;
a mower housing having a hood-shaped mower deck which is open towards a mowing side and within which is disposed the cutting tool, wherein the mower housing is configured for use with a motorized lawnmower having an internal combustion engine as the drive motor, and wherein a belt compartment configured to receive a drive belt connected to a drive shaft of the internal combustion engine is provided in the mower housing outside the mower deck;
wherein
the drive motor is an electric motor;
a cooling air routing having an air inlet, an air outlet and an air guiding path from the air inlet to the air outlet is formed in the mower housing;
a fan capable of being driven by the electric motor is disposed in the air guiding path; and
the belt compartment is configured to form part of the air guiding path.

2. The motorized lawnmower according to claim 1, wherein the belt compartment extends from a drive shaft region of the mower housing to a wheel drive region of the mower housing.

3. The motorized lawnmower according to claim 1, wherein the belt compartment extends so as to be substantially parallel to a rotation plane of the cutting tool.

4. The motorized lawnmower according to claim 1, wherein the belt compartment extends so as to be contiguous to a hood top side of the mower deck.

5. The motorized lawnmower according to claim 1, wherein the air inlet and the air outlet are located outside the mower deck.

6. The motorized lawnmower according to claim 1, wherein the air inlet is located in an upper region of the mower housing.

7. The motorized lawnmower according to claim 1, wherein the air outlet is located in a lower rear or lower front region of the mower housing outside the mower deck.

8. The motorized lawnmower according to claim 1, wherein the fan and the cutting tool are arranged coaxially on the drive shaft.

9. The motorized lawnmower according to claim 1, wherein the mower housing comprises a motor housing which is arranged on the mower deck and in which the drive motor is disposed.

10. Use of a mower housing having a hood-shaped mower deck which is open towards a mowing side and within which is arranged a cutting tool, for a lawnmower, wherein the mower housing is configured for use with a motorized lawnmower having an internal combustion engine as the drive motor, in that provided in the mower housing outside the mower deck is a belt compartment which is configured to receive a drive belt connected to a drive shaft of the motorized lawnmower, the mower housing is configured for use with a motorized lawnmower having an electric motor as the drive motor;

a cooling air routing having an air inlet, an air outlet and an air guiding path from the air inlet to the air outlet is formed in the mower housing;

a fan which is capable of being driven by the drive motor is disposable in the air guiding path; and the belt compartment is configured to form part of the air guiding path.

* * * * *